No. 867,999. PATENTED OCT. 15, 1907.
A. E. E. NORWICH.
CAR TRUCK.
APPLICATION FILED MAR. 28, 1907.

WITNESSES:
L. C. Reynolds
Henderson F. Hill

INVENTOR.
A. E. E. NORWICH
BY RIDOUT & MAYBEE
ATTORNEYS

UNITED STATES PATENT OFFICE.

ARTHUR EDWIN EVANS NORWICH, OF TORONTO, ONTARIO, CANADA.

CAR-TRUCK.

No. 867,999.  Specification of Letters Patent.  Patented Oct. 15, 1907.

Application filed March 28, 1907. Serial No. 364,995.

*To all whom it may concern:*

Be it known that I, ARTHUR E. E. NORWICH, of the city of Toronto, in the Province of Ontario, Canada, have invented certain new and useful Improvements in Car-Trucks, of which the following is a specification.

My invention relates to car trucks adapted to run on a wide or narrow gage track and to pass readily from one to the other, and my object is to devise a truck of that class adapted to run on a narrow gage track between the rails of a wide gage track and into a pit below said rails. I accomplish my object by securing the axles to the truck and journaling the wheels on the axles in such a manner that they may be moved in or out on said axles. The axles are short enough to pass between the wide gage rails, and the treads of the wheels are offset outwardly to enable them to run on the wide gage rails when moved out on said axles. Stops are provided limiting the inward movement of the wheels, and also releasable locks to hold them out on the axles, substantially as hereinafter more specifically described.

Figure 1:
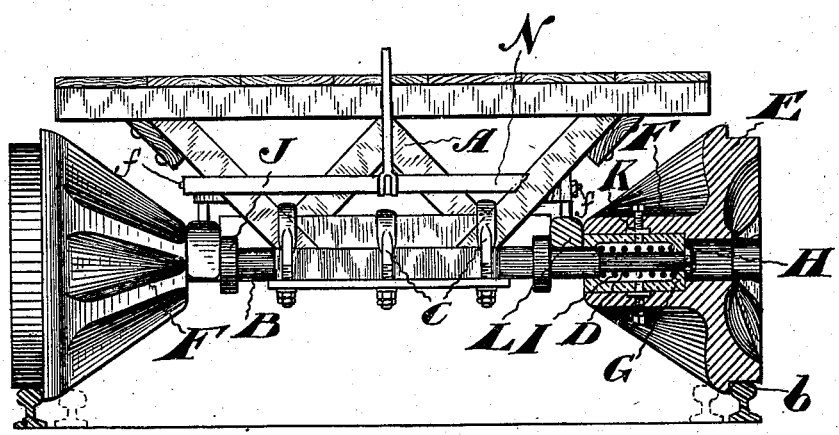
Figure 2:
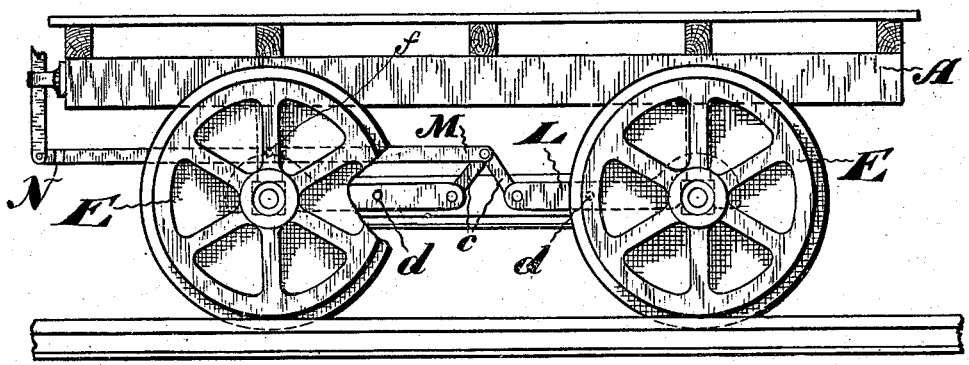
Figure 3:
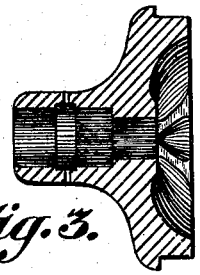
Figure 4:
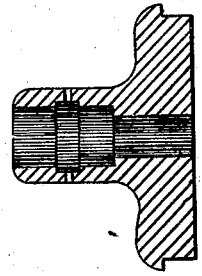

Figure 1 is an end view of my improved truck with one of the wheels in section. Fig. 2 is a side view of the same. Figs. 3 and 4 are cross-sections of modifications of the wheels shown in Fig. 1.

In the drawings like letters of reference indicate corresponding parts in the different figures.

A is the truck frame of any suitable construction. To this truck frame are secured the stationary axles B. I have shown these secured in place by the clips C. This construction may be varied to suit the purposes for which the truck may be used.

The outer end D of each axle is reduced in diameter as shown. Each wheel E is provided with an inwardly elongated hub F. Within this hub is preferably fitted a bushing G having bearings both on the main part of the axle and the end D.

The end of the axle is provided with any suitable means for preventing the wheels coming off. I show a collar H for this purpose sprung into a groove in the reduced end of the axle. Against this collar the wheel abuts, as shown in Fig. 1.

On the reduced end of the axle is placed a coil spring I, which abuts against the bushing and against the shoulder formed where the reduced end of the axle joins the main portion. This coil spring, it will be seen, tends to press the wheel outwardly on the axle, and to yieldingly maintain it in contact with the collar H.

A collar J is preferably formed on the axle to form a stop limiting the inward movement of the wheel. Within the hub of the wheel is formed an annular oil chamber K, from which oil openings lead through the bushing G.

Oil inlets closed by set screws or other suitable stops extend out through the hub and provide means for introducing oil into the oil chamber.

My truck being intended, as already set out, to pass down between the rails of a track of ordinary gage, it is necessary that the axle B be of a length less than the width between the bases of the wide gage track. In order therefore that the wheels may be adapted to engage the wide gage track I offset the treads b of the wheels outwardly to bring them into alinement with the rails. When it is desired to pass from wide to narrow gage tracks switches will be employed to gradually direct the wheels from the one track to the other. If the truck be passing from the wide to the narrow gage the wheels will be pressed inwardly against the tension of the springs.

When the truck is passing from the narrow gage to the wide gage track the wheels are pressed outwardly on the axles by the pressure of the springs.

In Fig. 3 I show a wheel without ribs on its back and in Fig. 4, a wheel with a flat instead of a concave outer face, either of which forms may be employed instead of that shown in Fig. 1.

It is necessary when the wheels are running on the wide gage track to provide means for locking them out on the axles. For this purpose I employ the locks L. These are independently pivoted at d on the truck, and each is adapted to fit over an axle between the collar J and the end of the hub F of the wheel.

To the tail of each lock is pivoted a link c, and these links are pivoted on the lever M, fulcrumed at f on the truck. The levers at each side of the truck are preferably connected by the cross bar N, so that they may be simultaneously operated to throw the locks up or down. Of course if a double truck car were being used it would be necessary to provide means for the simultaneous operation of the levers of each truck.

From the construction described it will be seen that I have devised a truck which will fit either a wide or narrow gage track, and that it is so arranged that the whole truck may pass down between the rails of the wide gage track to enter a pit below said track, if it be desired to use the truck for such a purpose.

What I claim as my invention is:

1. A car truck provided with stationary axles; wheels journaled on said axles and movable in and out thereon; and stops limiting the movement of the wheels in either direction.

2. A car truck provided with stationary axles; wheels journaled on said axles and movable in and out thereon; stops limiting the movement of the wheels in either direction; and releasable locks for holding the wheels out on said axles.

3. A car truck provided with stationary axles; wheels journaled on said axles, movable in and out thereon, and having their treads offset outwardly beyond the ends of the axles.

4. A car truck provided with stationary axles; wheels journaled on said axles and movable in and out thereon; stops limiting the movement of the wheels in either direction; and springs tending to move said wheels outwardly on said axles.

5. A car truck provided with stationary axles; wheels journaled on said axles and movable in and out thereon; stops limiting the movement of the wheels in either direction; releasable locks for holding the wheels out on said axles; and springs tending to move said wheels outwardly on said axles.

6. A car truck provided with stationary axles; wheels journaled on said axles, movable in and out thereon, and having their treads offset outwardly beyond the ends of the axles; and springs tending to move said wheels outwardly on said axles.

7. An axle reduced in diameter at its outer end, in combination with a wheel having bearings on both the main part and the end part of the axle; an end stop retaining the wheel on the axle; and a coil spring on the reduced part of the axle tending to force the wheel against the stop.

Toronto, Ont., 22d March, 1907.

ARTHUR EDWIN EVANS NORWICH.

Signed in the presence of—
JOHN G. RIDOUT,
F. W. MCKENDRICK.